United States Patent Office 3,152,191
Patented Oct. 6, 1964

3,152,191
LIQUID HALOGENATED HYDROCARBON STABILIZED WITH A PRIMARY ALKANOL AND AN ALKYL ALDEHYDE HYDRAZONE
Charles L. Cormany, Wadsworth, and William R. Dial, Akron, Ohio, assignors, by mesne assignments, to Pittsburgh Plate Glass Company
No Drawing. Filed Aug. 8, 1960, Ser. No. 47,927
8 Claims. (Cl. 260—652.5)

This invention deals with the stabilization of halogenated hydrocarbons. It more particularly concerns the protection of degreasing solvents, notably trichloroethylene, against undue decomposition.

Halogenated hydrocarbons, such as trichloroethylene, are quite common industrial solvents, especially suitable for degreasing of metals. Conditions prevailing in contemporary metal degreasing procedures cause severe and rapid deterioration of unstabilized solvent. For example, it is quite normal to use a given solvent charge continuously for extended periods, often on the order of six months. The degreasing solvent thus is in service for long periods under a wide variety of conditions responsible for rapid and severe decomposition. Considerable concentrations of geases, oil, dirt and fine metal particles accumulate in the degreasing solvent. In the presence of one or more of these components, unprotected trichloroethylene decomposes and deteriorates into a black viscous or solid residue, acid, phosgene, etc. Once this occurs, the continued use of contemporary degreasing operations is impractical if not impossible. Tedious and expensive cleaning operations are required before further operation of the degreaser can be resumed.

In the degreasing of certain metals such as aluminum, decomposition tendencies of degreasing solvents, notably trichloroethylene, are especially pronounced.

In accordance with this invention, it has now been discovered that in the presence of certain alcohols and aldehyde hydrazones, halogenated hydrocarbon solvents such as trichloroethylene evidence improved resistance to decomposition. Thus, trichloroethylene containing small amounts each of an appropriate monohydric alcohol and a hereinafter specified aldehyde hydrazone is of enhanced stability under those conditions prevailing in the degreasing of metals. When stabilized in accordance with this invention, the trichloroethylene is suitable for extended periods of use in the degreasing (both vapor and liquid) of metals, including light metals such as aluminum.

Aliphatic monohydric alcohols effective in the provision of stabilized trichloroethylene in accordance with this invention are the primary monohydric aliphatic alcohols of three to four carbons, e.g., propanols or butanols containing their hydroxyl group on a carbon atom to which two hydrogen atoms are linked, such as n-propanol and n-butanol. For benefits to ensue, such alcohol need be present in but a small concentration. Typical alcohol concentrations are on the order of between 0.001 and 2.0 percent (preferably 0.05 to 1.0 percent) by weight of the trichloroethylene or other halogenated hydrocarbon solvent.

Along with such alcohols, there is incorporated in the trichloroethylene an aldehyde hydrazone containing up to six carbon atoms. Such aldehyde hydrazones are the equimolecular condensation products of appropriate aldehydes and hydrazines. They are prepared, for example, according to the procedure described in F. Klages, Annalen, volume 547, pages 1 to 38 (1941), by the condensation reaction characterized with respect to acetaldehyde and hydrazine by the equation:

Useful aldehyde hydrazones are the equimolecular condensation products of a one to three carbon atom aldehyde, e.g., formaldehyde, acetaldehyde, propionaldehyde and acrolein, and a hydrazine or a substituted hydrazine

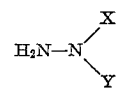

wherein either X or Y denote hydrogen or aliphatic groups of one to three carbons, e.g., dimethylhydrazine, diethylhydrazine, methylhydrazine, ethylhydrazine, methylethylhydrazine, and propylmethylhydrazine. Aldehyde hydrazones of up to six carbon atoms and having no aliphatic group of more than three carbon atoms linked to the aldehyde hydrazone characterizing structure

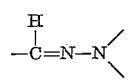

give the best results.

Especially recommended are acetaldehyde dimethylhydrazone and like aldehyde hydrazones soluble (in stabilizing concentrations) in trichloroethylene which have a normal boiling point close to the normal boiling point of trichloroethylene (within about 15° C.).

By formula, the contemplated aldehyde hydrazones are representable as:

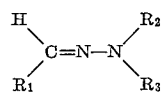

wherein $R_1$, and $R_2$ and $R_3$ may be either hydrogen or an aliphatic group including saturated and unsaturated aliphatic groups, notably alkyl groups of one to three carbons. The sum of the carbon atoms in the groups represented by $R_1$, $R_2$ and $R_3$ in the preferred hydrazones should not be greater than five. Specific aldehyde hydrazones include formaldehyde diethylhydrazone, formaldehyde dimethylhydrazone, formaldehyde methylethylhydrazone, acetaldehyde methylhydrazone, acetaldehyde methylethylhydrazone, formaldehyde propylhydrazone, formaldehyde isopropylhydrazone, and propionaldehyde hydrazone. Obviously, mixtures of such hydrazones are also useful.

Typical concentrations for the hydrazone are from 0.001 to 2.0 percent and preferably 0.01 to 0.5 percent aldehyde hydrazone by weight of the trichloroethylene or other halogenated hydrocarbon solvent. Although functional, larger concentrations are, as a rule, too costly.

The following demonstrates the stabilization of a halogenated hydrocarbon achieved in accordance with this invention:

EXAMPLE

A trichloroethylene composition containing by weight 0.28 percent 1,2-butylene oxide, 0.06 percent glycidol, 0.01 percent thymol and 0.025 percent acetaldehyde dimethylhydrazone was prepared. To separate portions of this trichloroethylene composition, various monohydric alcohols were added in concentrations of 0.25 weight percent of the trichloroethylene.

The stability of the respective portions were then tested by a procedure which involved charging to a 125 milliliter Erlenmeyer flask fitted with a condenser 50 milliliters of the solvent composition, 0.5 gram of anhydrous powdered sublimed aluminum chloride and 2 grams of fine aluminum turnings and refluxing the contents for 24 hours. Thereafter, the flask contents were cooled and filtered in a water-free atmosphere. The titer of the filtrate (number of milliliters of 0.1 Normal NaOH that must be added to bring a mixture of 25 milliliters of the filtrate and 75 milliliters of neutral distilled water to a neutral pH) is determined and the condition of the filtrate and aluminum turnings observed. The following table records the so obtained data:

Table I

| Alcohol | After Reflux | | |
|---|---|---|---|
| | Titer | Appearance of— | |
| | | Solvent | Aluminum Turnings |
| None | 23.0 | Black | Heavy tar. |
| Methanol | 38.1 | ____do____ | Black. |
| Ethanol | 35.2 | Yellow-green | Do. |
| n-Propanol | 10.2 | Light tan | Do. |
| i-Propanol | 32.5 | Light brown | Dark stain. |
| n-Butanol | 13.2 | Amber | Clean. |
| Isobutanol | 17.1 | Light amber | Do. |
| t-Butanol | | Black | Black. |

As evidenced by the foregoing data, the primary aliphatic alcohols (i.e., alkanols) of three or four carbons provided the effective stabilization as manifested by the limited amount of titer developed and the relative clarity of the solvent and cleanliness of the aluminum chips. Methanol, for example, gave rise to black solvent and black aluminum chips in addition to developing a high titer.

Stabilization of trichloroethylene in accordance with this invention using primary monohydric alcohol of three or four carbons and the characterized acetaldehyde hydrazone is not interfered with by the presence of other additives. Thus, the trichloroethylene may also include additives such as phenols, amines, epoxides, esters and the like. For example, there may be included in the trichloroethylene aromatic compounds having phenolic hydroxyl groups linked directly to a ring carbon such as phenol, thymol, catechol, para-cresol, guaiacol, methyl salicylate, eugenol, isoeugenol and like phenols having a normal boiling temperature on the order of 180° C. to 250° C.

Also, the trichloroethylene may include a wide variety of amines which, as a general class, have been reputed to provide stabilizing effects on the trichloroethylene. The presence of amines does not adversely affect the sabilizing action herein achieved by the joint use of the specific alcohols and aldehyde hydrazones. Among the typical amines are diethylamine, triethylamine, dipropylamine, tripropylamine, triisopropylamine, dibutylamine, di-sec-butylamine, diisobutylamine, diisopropylamine, diethanolamine, morpholine, N-methylmorpholine, triethanolamine, beta-picoline, pyridine, and aniline. Other nitrogenous additives which may be included include the pyrroles such as methylpyrrole.

Organic epoxides (oxiranes) may also be present in the trichloroethylene. As a rule, the useful epoxides include ethylene oxide, 1,2-propylene oxide, 1,2-butylene oxide, 2,3-butylene oxide, butadiene monoxide, butadiene dioxide, epichlorohydrin, glycidol, isobutylene oxide, 1,2-octylene oxide, 2,3-octylene oxide, 2,3-diisobutylene oxide, styrene oxide, cyclohexene oxide and cyclopentene oxide.

By oxiranes or epoxides compounds having an oxygen connected to adjacent carbons, e.g., having the group

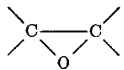

are intended.

Other additives include ethyl acetate or like esters of organic monocarboxylic acids and alcohols such as propynyl alcohol, methanol, ethanol and unsaturated compounds like pinene and diisobutylene also may be present.

As a rule, the concentration of all additives present for the purpose of stabilization is limited to less than about 2 percent by weight of the trichloroethylene. Each additive's individual concentration may vary considerably, but usually ranges from 0.001 to 0.5 percent by weight of the trichloroethylene. Even then, considerable discretion is advisable.

While the present invention has been described with respect to the stabilization of trichloroethylene and is especially effective with trichloroethylene, other liquid halogenated hydrocarbons of one to three carbons may also be beneficially stabilized following the principles of this invention. Thus, the stability of chlorinated aliphatic hydrocarbons such as methyl chloride, carbon tetrachloride, ethyl chloride, 1,1-dichloroethane, 1,2-dichloroethane, perchloroethylene, 1,1,2-trichloroethane, and 1,1,1-trichloroethane may be improved by following the principles of this invention.

Although the present invention has been described by reference to specific details of certain embodiments, it is not intended that the invention be construed as limited to such details except insofar as such details appear in the appended claims.

We claim:
1. A composition comprising a liquid halogenated aliphatic hydrocarbon of one to three carbons containing in stabilizing concentration both a primary alkanol of three to four carbons and an alkyl aldehyde hydrazone containing from one to three alkyl groups, each of which alkyl groups contains from one to three carbon atoms.

2. A composition comprising a liquid halogenated aliphatic hydrocarbon of one to three carbons containing in stabilizing concentration a primary alkanol of three to four carbons and an alkyl aldehyde hydrazone having up to six carbon atoms and containing from one to three alkyl groups, each of which groups contains from one to three carbon atoms.

3. A degreasing solvent composition comprising a liquid chlorinated aliphatic hydrocarbon degreasing solvent containing in stabilizing concentration n-propanol and an alkyl aldehyde hydrazone having up to six carbon atoms and containing from one to three alkyl groups, each of which alkyl groups contains from one to three carbon atoms.

4. A composition comprising trichloroethylene containing in stabilizing concentration a primary alkanol of three to four carbon atoms and an alkyl aldehyde hydrazone containing from one to three alkyl groups, each of which alkyl groups contains from one to three carbon atoms.

5. A composition comprising liquid halogenated hydrocarbon of one to three carbons containing in stabilizing concentration both a monohydric aliphatic primary alcohol of three to four carbons selected from the group consisting of n-propanol, n-butanol and isobutanol and an alkyl aldehyde hydrazone containing one to three alkyl groups, each of which contains one to three carbon atoms.

6. A composition comprising trichloroethylene containing from 0.001 to 2.0 percent by weight of primary alkanol of three to four carbon atoms and from 0.001 to 2.0 percent by weight of an alkyl aldehyde hydrazone containing from one to three alkyl groups, each of which groups contains from one to three carbon atoms.

7. A composition comprising trichloroethylene containing from 0.05 to 1.0 percent by weight of a primary alkanol of three to four carbon atoms and from 0.01 to 0.5 percent by weight of acetaldehyde dimethylhydrazone.

8. A composition comprising trichloroethylene containing from 0.05 to 1.0 percent by weight of a primary alkanol of three to four carbon atoms and from 0.01 to 0.5 percent by weight of acetaldehyde dimethylhydrazone, said alcohol and said hydrazone percentages being based on the trichloroethylene content.

References Cited in the file of this patent
UNITED STATES PATENTS

| | | |
|---|---|---|
| 2,043,257 | Missbach | June 9, 1936 |
| 2,043,259 | Missbach | June 9, 1936 |
| 2,978,518 | Da Daras | Apr. 4, 1961 |
| 3,000,978 | Frendenburgh | Sept. 19, 1961 |
| 3,025,331 | Dial | Mar. 13, 1962 |
| 3,043,888 | Pray | July 10, 1962 |